United States Patent
Mehendale et al.

(10) Patent No.: US 7,464,610 B2
(45) Date of Patent: *Dec. 16, 2008

(54) CORIOLIS FLOWMETER HAVING A CONTACTLESS EXCITATION DEVICE

(75) Inventors: Aditya Mehendale, Ruurlo (NL); Joost Conrad Lötters, Gaanderen (NL); Jan Marinus Zwikker, Hengelo (NL)

(73) Assignee: Berkin B.V., Ruurlo (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/043,977

(22) Filed: Mar. 7, 2008

(65) Prior Publication Data

US 2008/0148868 A1    Jun. 26, 2008

Related U.S. Application Data

(62) Division of application No. 11/412,175, filed on Apr. 27, 2006, now Pat. No. 7,353,718.

(30) Foreign Application Priority Data

May 2, 2005   (NL)   .................................... 1028939

(51) Int. Cl.
*G01F 1/84* (2006.01)
(52) U.S. Cl. ................................. 73/861.355
(58) Field of Classification Search ............. 73/861.355
See application file for complete search history.

(56) References Cited

U.S. PATENT DOCUMENTS

| | | | |
|---|---|---|---|
| 4,658,657 A | 4/1987 | Kuppers | |
| 5,020,380 A | 6/1991 | Keita et al. | |
| 5,038,620 A | 8/1991 | Rogers, Jr. et al. | |
| 5,355,737 A | 10/1994 | Lew et al. | |
| 5,400,653 A | 3/1995 | Kalotay et al. | |
| 5,757,704 A | 5/1998 | Van Der Pol et al. | |
| 6,704,501 B1 * | 3/2004 | Washisu | 396/55 |
| 7,168,329 B2 | 1/2007 | Bell et al. | |
| 7,340,965 B2 * | 3/2008 | Mehendale et al. | 73/861.355 |
| 7,353,718 B2 * | 4/2008 | Mehendale et al. | 73/861.355 |
| 2003/0097881 A1 | 5/2003 | Schlosser et al. | |
| 2006/0042402 A1 | 3/2006 | Bell et al. | |

FOREIGN PATENT DOCUMENTS

DE   42 26 391   2/1994
EP   0 361 388   4/1990

* cited by examiner

*Primary Examiner*—Harshad Patel
(74) *Attorney, Agent, or Firm*—Young & Thompson

(57) ABSTRACT

A mass flowmeter of the Coriolis type with a tube through which a medium flows during operation and with excitation elements for causing the entire tube or part thereof to perform a rotational vibration about a primary axis of rotation during operation. The excitation elements are electromagnetic and do not make contact with the tube during operation and have no components that are fastened to the tube. The tube is made of an electrically conducting material, and the excitation elements include first members for causing an electric current to flow through the tube during operation and second elements for generating a magnetic field at the area of a portion of the tube. The magnetic field is perpendicular to the direction of the current and in operation either the current or the magnetic field changes its sign periodically.

7 Claims, 7 Drawing Sheets

CORIOLIS FLOWMETER HAVING A CONTACTLESS EXCITATION DEVICE

FIELD OF THE INVENTION

The invention relates to a mass flowmeter of the Coriolis type with a sensing tube through which a medium flows during operation and with excitation means for causing the entire tube or part thereof to oscillate about an excitation axis of rotation during operation.

BACKGROUND OF THE INVENTION

Such a mass flowmeter is known from U.S. Pat. No. 4,658,657.

The known mass flowmeter comprises a loop-shaped tube (half a turn) that forms a transverse branch at one side and two lateral branches clamped in at the opposite side in a mounting beam. The latter is mounted in a support such that it can rotate about a central axis lying in the plane of the loop. An electromagnetic excitation system cooperating with the mounting beam provides an oscillatory rotation (rotational vibration) of the mounting beam with the loop about the central axis. (The term 'excitation' is here understood to mean 'causing to oscillate').

When a medium (gas or liquid) flows through the loop that rotates about the central axis, Coriolis forces are generated in the transverse branch, resulting in an oscillation of the loop about a secondary axis. This oscillation, which is proportional to the flow, is superimposed on the fundamental oscillation and leads to a phase shift between the oscillations performed by the ends of the transverse branch. The phase difference is proportional to the Coriolis force and accordingly to the flow.

It is a disadvantage of the known system, however, that the mounting beam used for the excitation of the loop constitutes an additional mass. This prevents a change in the excitation frequency as a function of the density of the medium flowing through the tube, with the result that a measurement of the density (an additional property of a Coriolis flowmeter) becomes less accurate.

SUMMARY OF THE INVENTION

The invention has for its object inter alia to provide a flowmeter with an excitation system that is capable of measuring the density more accurately.

The mass flowmeter of the kind mentioned in the opening paragraph is for this purpose characterized in that the excitation means are (electro)magnetic and in operation do not make contact with the tube and have no components that are fastened to the tube. In other words: the excitation means are free from the movable portion of the tube both in the idle and in the operational state. It is noted that the tube may be, for example, a straight tube, a looped tube forming half a turn, a looped tube forming a full turn, or a looped tube forming a double turn.

The mass flowmeter according to the invention has an enhanced sensitivity because the (movable portion of the) tube is free from additional excitation components (=no added mass). A possibility of causing the tube to rotate is found in the use of a tube of magnetizable metal material, such as soft iron, in combination with one or two electromagnetic coils that can be energized in a pulsating mode (i.e. utilizing the natural magnetism of the tube material: operating in the way of a relay).

An embodiment of the flowmeter according to the invention is for this purpose characterized in that the tube is manufactured from a magnetizable material, and in that in operation the excitation means generate a magnetic field configuration at the area of at least a portion of the tube that causes the tube to enter a swing excitation mode or a twist excitation mode.

A preferred embodiment, however, is characterized in that the tube is manufactured from an electrically well conducting material, and the excitation means comprise first means for causing an electric current to flow through the tube wall during operation and second means for generating a magnetic field transverse to the direction of the current at the area of a portion of the tube, either the current or the magnetic field changing its sign periodically during operation, such that the (Lorentz) force generated by the product of the current and the magnetic field acts on the tube portion in a periodically changing direction. In this manner an oscillatory rotation (vibration) of the entire tube or part thereof about the excitation axis (primary axis) can be generated. The advantage of the use of Lorentz forces is that they can be generated in a simple manner by means of an electric current through the tube and a magnet, while generating sufficiently great forces at limited constructional dimensions for bringing the tube into oscillation.

The flowmeter according to the invention may be fitted with first (excitation) means that generate a direct current in the tube wall and with second (excitation) means that generate a magnetic field with a periodically changing sign.

However, an embodiment that can be very readily implemented is characterized in that the second means generate a permanent magnetic field and the first means generate an alternating current in the tube wall.

An embodiment for exciting the tube in the swing excitation mode is characterized in that the second excitation means comprise two magnet poles situated opposite one another, between which poles an air gap is present, through which air gap a portion of the tube is passed, an alternating current flowing through this tube portion in operation such that the tube portion in operation is subjected to an excitation by force, resulting in an oscillatory rotation of the tube or tube portion about the excitation (or primary) axis of rotation.

The above is applicable to a loop-shaped as well as to a straight tube.

An embodiment for exciting the tube in a twist mode is characterized in that the excitation means provide two oppositely directed permanent magnetic fields located at some distance from one another, each formed between two magnet poles located opposite one another between which an air gap is present, through which air gaps a portion of the tube is passed, an alternating current flowing through said tube portion in operation such that a torque excitation of the tube portion arises in operation, resulting in a rotational vibration of the tube or tube portion about an excitation axis of rotation.

Again, the above is applicable to a loop-shaped as well as to a straight tube.

The torque excitation described above may be achieved by means of two separate magnet yokes each provided with an air gap. A difficulty is, however, to ensure that the magnetic fields in the gaps are equally strong. A preferred embodiment of the invention in this respect is characterized in that the second excitation means comprise a circumferential permanently magnetic magnet yoke that is arranged parallel to a plane through the tube with two pairs of magnet poles arranged two by two in mutual opposition, between which pairs a first and a second gap are present, in which gaps oppositely directed magnetic fields are generated and through which gaps a portion of the tube extends, an alternating current flowing through said tube portion in operation such that a torque excitation of the tube or tube portion arises in operation, resulting in and oscillatory rotation of the tube about the excitation axis of rotation.

Again, the above is applicable to a loop-shaped as well as to a straight tube.

An alternative embodiment may be used for the generation of a constant or alternating magnetic field in the gap or gaps, which is characterized in that the magnetic field is generated by means of an electric coil wound around a magnetic yoke with at least one gap, which coil is connected to an electric circuit designed to pass a direct current or an alternating current through said coil in operation, whereupon the first means cause an alternating current or a direct current, respectively, to flow through the tube wall. This at the same time offers the possibility to adjust the strength of the magnetic field.

The first means for generating a current in the tube wall may be means that inject a current directly into the tube wall, for example through connection terminals. Direct current injection, however, is a method that is less desirable for certain applications. Indirect current injection is preferred.

In this connection, an embodiment is characterized in that at least one transformer core is provided around the tube, the tube constituting a (closed) secondary winding while a coil provided on the transformer core constitutes a primary winding, so that a current is induced in the tube wall when the primary winding is energized.

U.S. Pat. No. 4,658,657 mentions that two measuring devices are used adjacent the ends of the transverse arm of the loop for measuring the phase shift between the oscillations performed by the ends of the transverse arm. It is found that it is not possible to measure with a high accuracy with such an arrangement.

An embodiment of the invention provides a system with which a more sensitive measurement becomes possible.

The mass flowmeter of the kind mentioned in the opening paragraph is for this purpose characterized in that it is provided with at least two optical sensors for measuring deformation of the tube occurring under the influence of a medium flowing through the tube, which sensors are situated on either side of the point of intersection (pole) of the primary axis of rotation and a tube portion of which the deformation is to be measured, the distance from each sensor to said point of intersection being between 5% and 25% of half the length of said tube portion.

Preferably, the optical sensors are opto-electronic sensors which each comprise a light source located at one side of the tube portion and a photosensitive cell located at the opposite side of the tube portion in the light path of the light source, such that the portion of the light not intercepted by the tube is measured.

An alternative embodiment is characterized in that the optical sensors are opto-electronic sensors which each comprise a light source located at one side of the tube portion and a photosensitive cell located at the same side of the tube portion in the path of the light reflected by the tube portion, such that either the intensity of the reflected light incident on the photosensitive cell, or the location of the reflected light on the photosensitive cell, is measured.

Advantageous, furthermore, is a positioning of the light source relative to the tube portion such that 40 to 60% of the active surface area of the photosensitive cell is illuminated by the light source in the idle mode.

The flowmeter according to the invention has an enhanced sensitivity thanks to the placement of the sensors close to the axis, because now the measured amplitude of the fundamental oscillation does not become too great in relation to that of the Coriolis force, as is indeed the case in the arrangement of U.S. Pat. No. 4,658,657.

The sensitivity of the mass flowmeter according to the invention is even further increased if a looped tube is used which is flexibly suspended by means of its inlet and outlet tubes. An embodiment is for this purpose characterized in that the loop follows a substantially circumferential, mechanically closed path, in that the loop is connected to a flexible inlet tube and to a flexible outlet tube for the flowing medium, and in that the loop is flexibly suspended by means of said flexible inlet and outlet tubes such that the resulting suspension allows a movement about two mutually perpendicular axes in the plane of the loop, one for the excitation movement and one for the Coriolis movement that arises when a medium is flowing through the tube.

BRIEF DESCRIPTION OF THE DRAWINGS

A few embodiments of the invention will be explained in more detail with reference to the drawing.

DETAILED DESCRIPTION OF THE PREFERRED EMBODIMENTS

Figure 1:
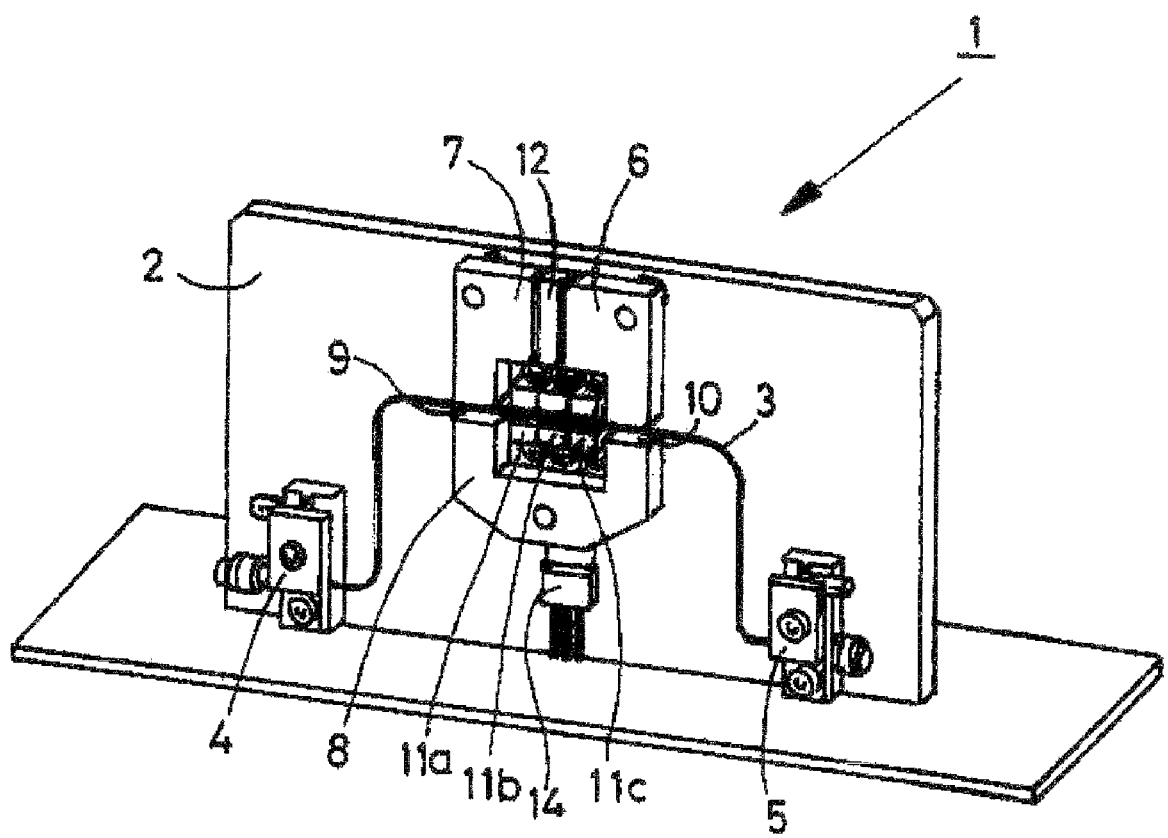
FIG. 1 is a perspective view of a Coriolis flowmeter according to the invention with a U-shaped tube.

FIG. 1 shows an embodiment of a Coriolis flowmeter 1 according to the invention. It is provided with a frame having a base plate 2 which supports a tube 3 through which a medium flows during operation. The tube 3 is a looped tube in this case constituting a half-turn, but it may alternatively be, for example, a straight tube or a looped tube with a full turn (closed loop). Looped tubes are preferred because they are more flexible than straight tubes. The tube 3 is fastened to the base plate 2 by fastening means 4, 5. The means 4, 5 form clamping locations relative to which the tube 3 is capable of moving. The tube 3, which may be made, for example, of stainless steel with a wall thickness of approximately 0.1 mm and a diameter of approximately 0.7 mm, forms a very lightweight construction within the scope of the invention which can be brought into resonance with a small amount of energy. The external diameter of the tube will generally be smaller than 1 mm and its wall thickness 0.2 mm or less, depending on the external dimensions of the loop 3 and the pressure the tube should be able to withstand (for example 100 bar).

Figure 2:
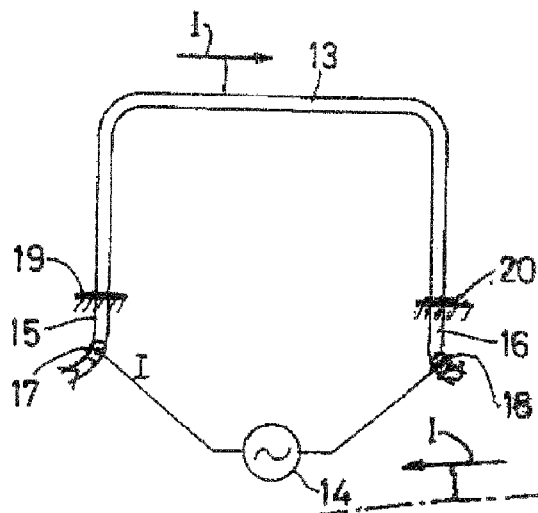
FIG. 2 shows the U-shaped tube of the flowmeter of FIG. 1 into which an electric current is directly injected.

To realize a very light construction, no further components that give the tube 3 an additional mass have been mounted to the tube 3. This is possible because Lorentz forces are used for exciting the tube, i.e. causing it to vibrate, in the construction of FIG. 1 (Lorentz force: electrons moving in a magnetic field undergo a force having a direction perpendicular to both the direction of the magnetic field and the direction of the current). These forces are generated in the flowmeter 1 of FIG. 1 because an electric current is passed through the wall of the (electrically conducting) tube 3 while at the same time a permanently magnetic magnet yoke 6, 7, 8, 12 (12 representing a permanent magnet with one pole directed towards yoke portion 6 and an opposite pole towards yoke portion 7) provided with a central opening generates two oppositely directed magnetic fields in the plane of the tube 3 transversely to the direction of the current. An electric current I can be directly injected into a (U-shaped) tube 13 of electrically conducting material in that, as shown in FIG. 2, a current source 14, an AC source in this case, is connected to ends 15, 16 of the tube 13 via connection terminals 17, 18.

Figure 3:
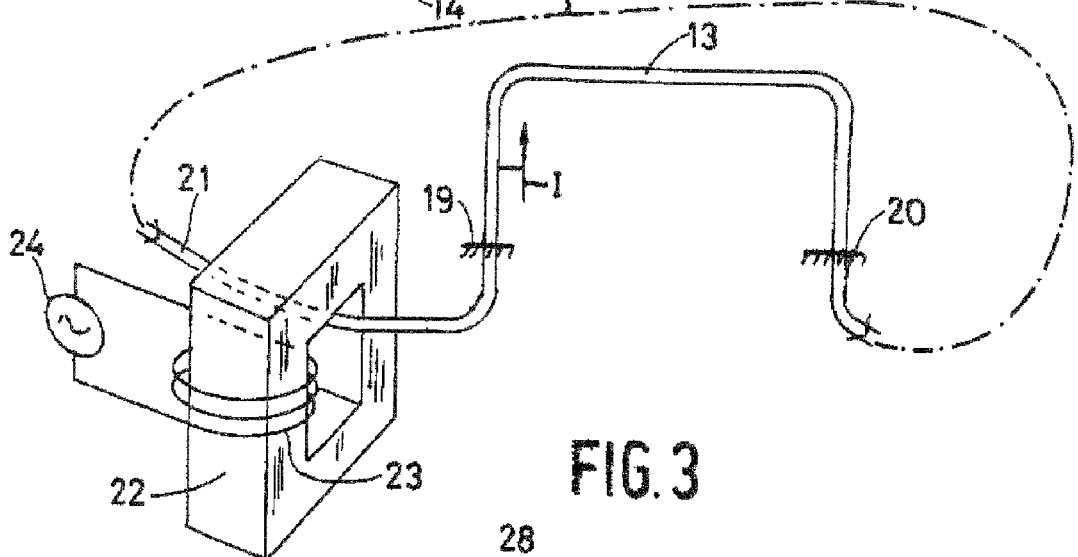
FIG. 3 shows the induction of a current in a tube portion by means of a transformer core with a coil.

Preferably, however, an electric current is generated in the tube by means of induction. FIG. 3 shows how this is achieved for the same U-shaped tube 13 as in FIG. 2. A tube portion 21 of the U-shaped tube 13 here extends through a transformer core 22. A primary coil 23 is wound on this core 22, which coil can be energized by a current source 24 connected thereto. The tube portion 21 thus acts as a secondary coil in which a current I is induced when a current flows through the primary coil 23. The tube portion 21 for this purpose forms part of an electrically closed loop (indicated with a broken line). This loop may be closed via the tube or via the housing. The transformer coil 22 with the primary coil 23 is provided around an 'external' portion 21 of the tube 13 outside the fastening points 19, 20 and stationary during operation in this case. The tube portion 21 may serve, for example, as an inlet or outlet conduit. Alternatively, however, the transformer core 22 may be arranged around an 'internal' portion of the tube that moves during operation, lying within the fastening points 19, 20, provided there is enough space. If there is little space, the one, comparatively bulky transformer core with primary coil may be replaced by two smaller transformer cores each with a primary coil, for example one around each of the legs of the U-shaped tube 13.

Figure 4A:
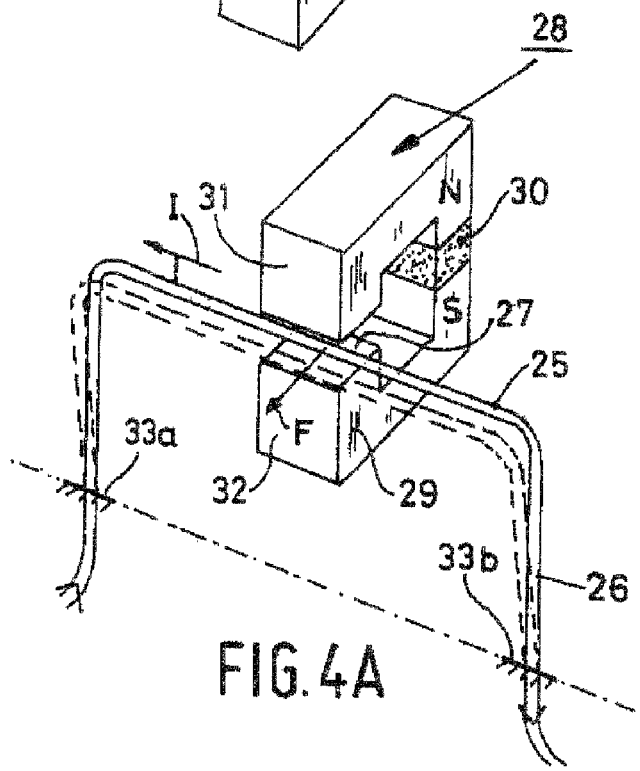
FIG. 4A shows a permanently magnetic magnet yoke with one gap through which a tube portion of a U-shaped tube extends.
Figure 4B:
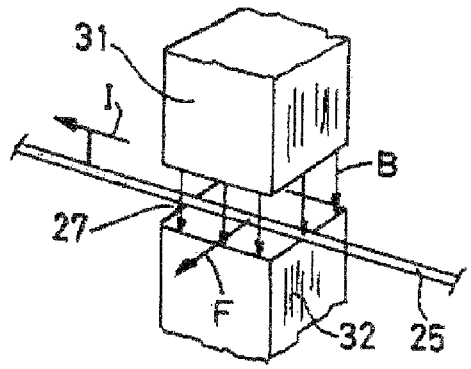
FIG. 4B shows a detail from FIG. 4A.

FIG. 4A shows by way of example how the magnetic field required for generating the Lorentz forces can be obtained. A tube portion 25 of the U-shaped tube 26 is for this purpose passed through an air gap 27 of a permanently magnetic magnet yoke 28. The tube 26 is clamped in in locations 33a and 33b. The yoke 28 comprises a core 29 of a soft magnetic material (for example soft iron) with the North pole N and South pole S of a permanent magnet 30 arranged in the path formed by said material such that the lines of force of the magnetic field generated in the air gap 27 extend parallel to the plane of the U-shaped tube 26 and are perpendicular to the current I, which is either directly injected into the tube 26 or induced in the tube 26. All this is shown in detail in FIG. 4B. This shows how the poles 31 and 32 of the magnet yoke 28 of FIG. 4A enclose the air gap 27, as well as the magnetic lines of force B of the magnetic field generated in the air gap 27. The result is that a (Lorentz) force F is generated under the influence of the current I that passes through the magnetic field, causing the tube portion 25 to move, for example, in forward direction (shown in broken lines in FIG. 4A). When the current I flows in the opposite direction through the tube, a (Lorentz) force will be generated in the opposite direction, i.e. moving the tube portion 25 to the rear. The excitation by force described here causes the tube to move about an excitation axis of rotation that passes through the clamping locations 33a, 33b.

Figure 5:
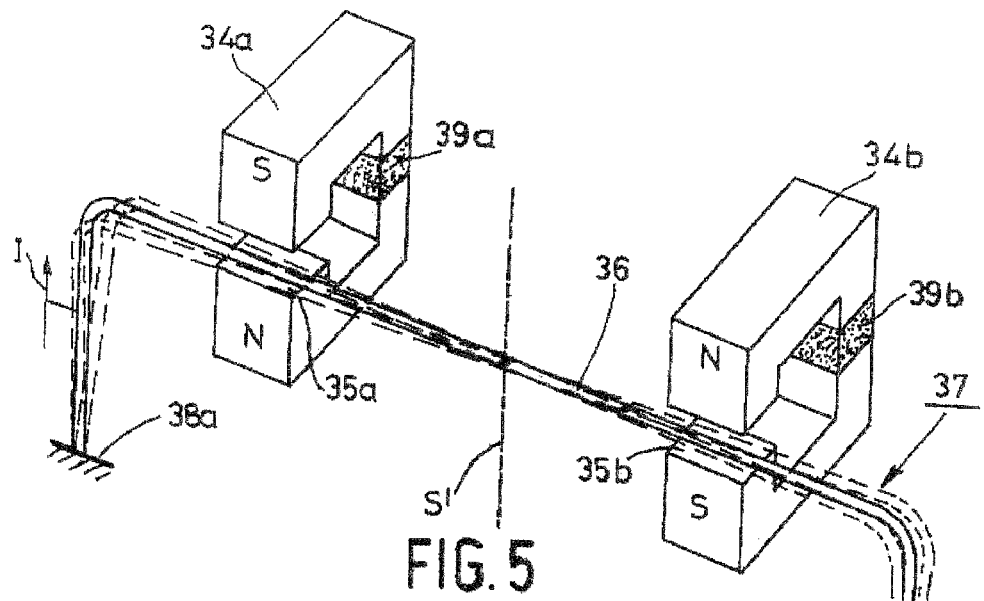
FIG. 5 shows how a torque excitation is applied to a tube portion by means of two independently located permanently magnetic magnet yokes.

FIG. 5 shows the use of two magnet yokes 34a and 34b with permanent magnets 39a, 39b incorporated therein, conforming to the type 28 described with reference to FIG. 4, which magnets are located at some distance from one another and each have an air gap 35a, 35b, in which gaps oppositely directed magnetic fields are generated. A U-shaped sensing tube 37 is clamped in in locations 38a, 38b. A tube portion 36 of the U-shaped tube 37 extends through the two gaps 35a, 35b. When a current I flows through the tube 37, the generated Lorentz forces will cause the left-hand section of the tube portion 36 present in the gap 35a to move, for example, in forward direction and the right-hand section of the tube portion 36 present in the gap 35b to move to the rear. When the direction of the current I is reversed, the right-hand section of the tube portion will move forward and the left-hand section to the rear (shown in broken lines). The torque excitation described here causes the tube 37 to rotate about an axis of rotation S' that coincides with the main axis of symmetry of the U-shaped tube 37. A problem with this arrangement is, however, that it is difficult to provide the magnet yokes with magnets of exactly the same strength.

Figure 6A:
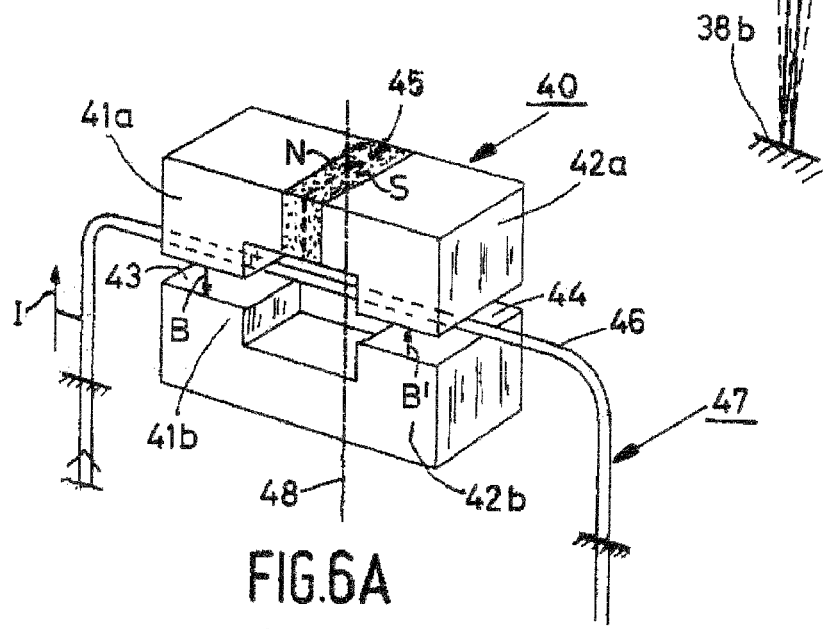
FIG. 6A is a perspective view and FIG. 6B a front elevation of a permanently magnetic magnet yoke with two gaps through which a tube portion extends, showing how a torque excitation is applied to the tube portion.
Figure 6B:
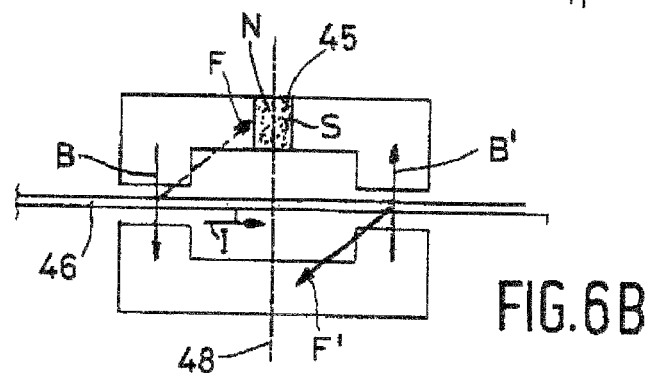

FIG. 6A is an elevation of an integrated permanent magnet yoke 40 with which this problem is solved. The integrated yoke 40 has a first pair of mutually opposed magnet poles 41a, 41b and a second pair of mutually opposed magnet yokes 42a, 42b. A respective air gap 43, 44 is formed between the poles of each of the pairs. The tube portion 46 the U-shaped tube 47 extends through these gaps. A permanent magnet 45 is positioned in the path of the, circumferential, yoke 40 with its North and South poles oriented such that oppositely directed magnetic fields B and B' are generated in the air gaps 43, 44. Given a direction of the current I as indicated in the diagrammatic FIG. 6B, which is a front elevation of the assembly of FIG. 6A, Lorentz forces F (directed to the rear) and F' (directed to the front) will now act on the tube portion 46, which forces will be reversed when the current direction in the tube wall is reversed. This torque excitation causes the tube 47 to perform a reciprocating rotational movement (vibration) about an axis 48 which coincides with the main axis of symmetry of the U-shaped sensing tube 47. The permanently magnetic yoke 40 with the two air gaps for torque excitation is designed such that the values of the forces F and F' are equal in principle and oppositely directed. A non-ideal torque excitation arises when the forces have different values. In the ideal case in which they are exactly the same, a pure torque or moment of force arises equal to the product of the force F and the spacing between F and F'. The direction of the torque vector (usually denoted T) then is along the centerline 48 of the yoke 40 in FIG. 6B.

Figure 7:
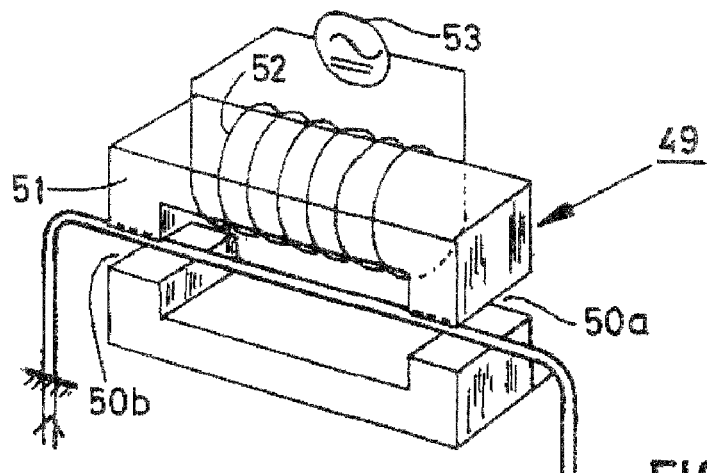
FIG. 7 shows a magnet yoke with a coil wound thereon and two gaps through which a tube portion of a U-shaped tube extends.

FIG. 7 shows an alternative embodiment of an integrated magnet yoke. The magnet yoke 49 with a magnet core 51 provided with two air gaps 50a, 50b is not energized by means of a permanent magnet in this case, but by means of a coil 52 wound on the magnet core 51 of the yoke 49 and connected to a direct or alternating current source 53. A tube portion of a U-shaped tube extends through the air gaps 50a, 50b.

Figure 8:
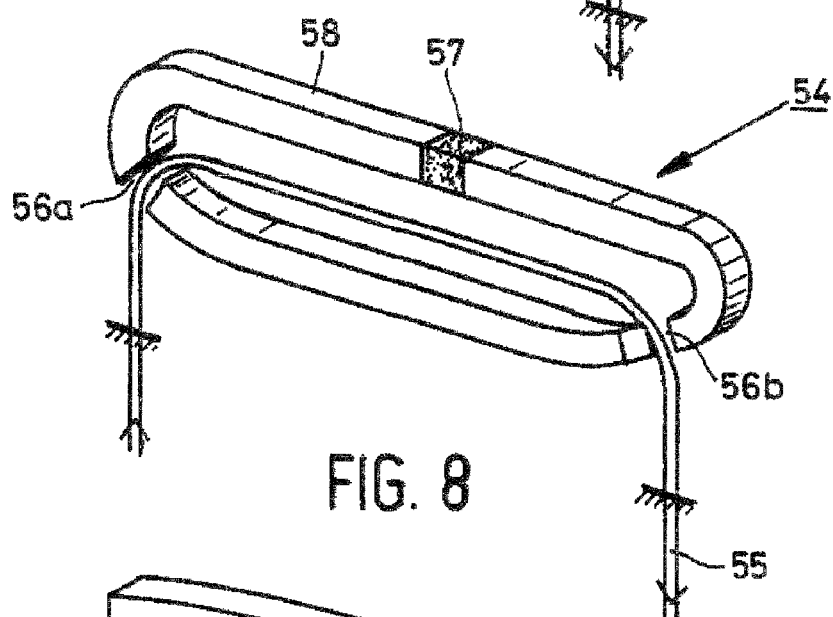
FIGS. 8 and 9 show alternative embodiments of a magnet yoke with gaps through which a tube portion of a U-shaped tube extends.

FIG. 8 shows a magnet yoke 54 where the excitation of the U-shaped tube 55 takes place in the bends of the U-shaped tube 55 extending through the air gaps 56a, 56b. The yoke 54 is energized by a permanent magnet 57, which is shown in the center of the upper leg 58 of the yoke 54 in the construction of FIG. 8, but which may be accommodated in an alternative location in the yoke. This is also true for the yokes shown in the other Figures.

Figure 9:
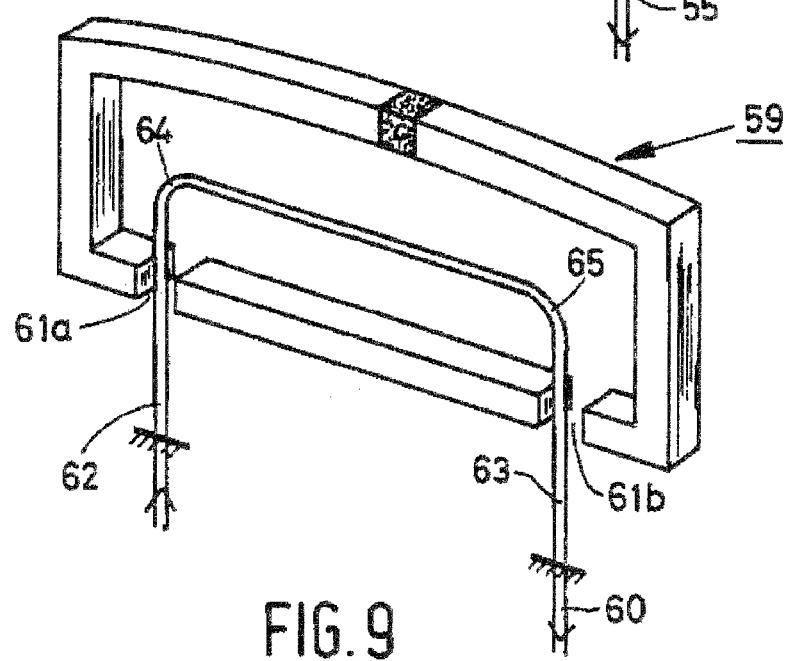

FIG. 9 shows a magnet yoke 59 where the excitation of the U-shaped tube 60 takes place on the lateral arms 62, 63, i.e. even below the bends 64, 65, of the U-shaped tube 60 extending through the air gaps 61a, 61b.

It will be obvious that all aspects of the invention explained with reference to U-shaped tubes are equally valid for other shapes of tubes that can be used in Coriolis flowmeters, i.e. not just tubes having a half-open turn, but also straight tubes and tubes forming a closed, full turn.

Figure 15:
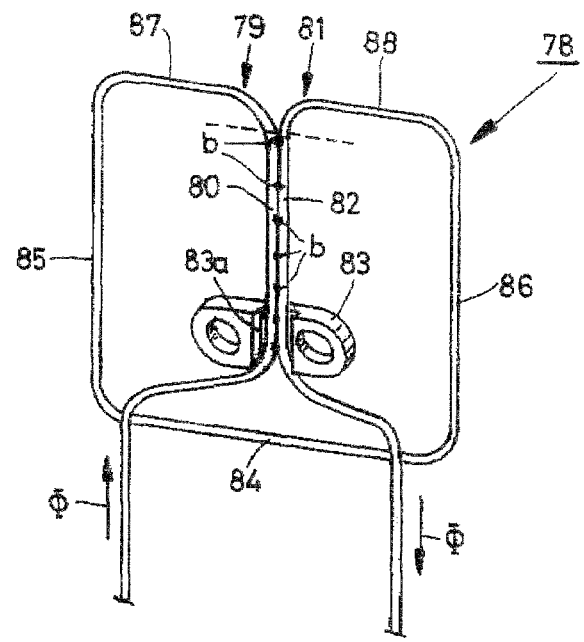
FIG. 15 shows a looped tube that is flexibly suspended by its inlet and outlet tubes.

Particularly suitable for use with the excitation principle set out above is a loop-shaped tube that forms a mechanically closed rectangular turn, wherein the start and end points of the turn are connected to a central inlet tube and a central outlet tube, respectively, the loop-shaped tube being resiliently suspended by means of said inlet and outlet tubes (FIG. 15).

The basic idea of the invention is to achieve excitation without additional components having to be provided on the tube for this purpose. This is possible because properties of the tube itself are utilized. The excitation may be achieved not only by means of Lorentz forces, but also by utilizing the magnetic properties of the tube itself. In that case a tube of magnetizable material is used in combination with one or two coils that are driven in a pulsating mode, generating a magnetic field so as to magnetize the material of the tube locally.

The inventive principle may also be used in a Coriolis flowmeter having a double tube, both of a type in which the directions of flow of the medium are mutually opposed and of a type in which the directions of flow of the medium are the same.

The full benefit of the inventive idea, however, can only be obtained if the detection of the deviations of the tube under the influence of a flowing medium (the detection of the Coriolis effect) takes place such that no additional components need be mounted to the tube.

For this purpose, according to the invention, one or several optical sensors are used, referenced 11a, 11b, and 11c in FIG. 1. The optical sensors in the construction of FIG. 1 are arranged in the central opening of the magnet yoke 6, 7, 8, 12 such that they can interact with the tube. A temperature sensor is referenced 14.

Figure 10A:
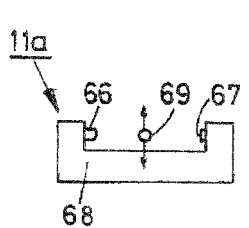
FIGS. 10A and B diagrammatically show an optical sensor operating with transmitted light as used in the flowmeter of FIG. 1.

FIG. 10A shows one of the optical sensors, in this case opto-electronic sensor 11a, in more detail. It comprises a U-shaped housing 68 with a light source 66 (for example a LED) at the inner side of one leg of the U, and a light-measuring cell 67 (for example a phototransistor) at the inner side of the other leg of the U. The opto-electronic sensor 11a is arranged such that a tube portion 69 can move between the legs of the U-shaped housing 68. During operation, the tube will cover the light path between the light source 66 and the photocell 67 to a greater or lesser degree.

Figure 10B:
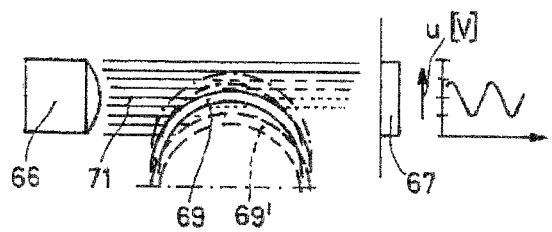

FIG. 10B shows in greater detail how the tube portion 69, owing to its movement, blocks out a larger or smaller portion of the light beam 71 transmitted from the light source 66 to the photocell 67. The photocell 67 produces a signal u (V) that can be measured by a meter. The light beam may be a parallel beam or a divergent beam.

Figure 11:
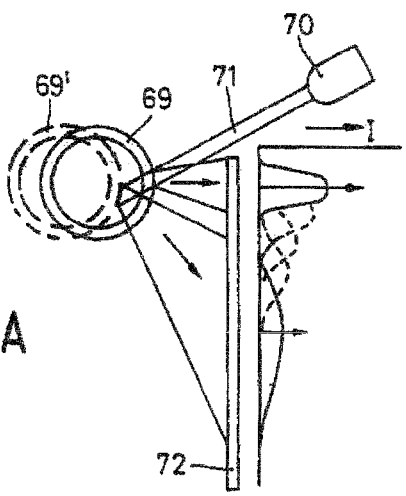
FIG. 11 diagrammatically shows an alternative arrangement with an optical sensor operating with reflected light.

FIG. 11 shows an alternative to the sensor arrangement of FIG. 10. Here the tube portion 69 and the light source 70 are so arranged that the transmitted light beam 71 is incident on a photocell 72 after being reflected by the tube portion 69. When the tube portion performs a reciprocating movement during operation, the reflected spot will move over the surface of the photocell 72. The tube portion 69 may be provided with a reflecting surface at the side of the photocell 72, if so desired.

Figure 12:
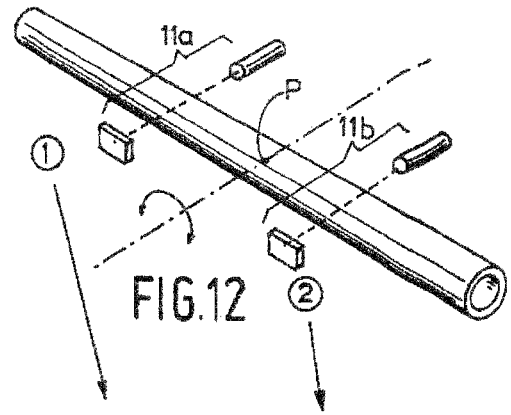
FIG. 12 shows an arrangement of two optical sensors and a tube portion.

FIG. 12 diagrammatically shows the detection by means of two opto-electronic sensors 11a, 11b. According to one aspect of the invention, these are located on either side of, and preferably symmetrically with respect to, the location where the axis of rotation, about which the excitation means cause the tube to rotate, intersects the tube portion 69. This point of intersection is denoted the rotation pole P. The sensors 11a, 11b are preferably at a short distance from this pole. Said distance should be sufficiently small for ensuring that the measured contribution of the excitation is of the same order of magnitude as the measured contribution of the Coriolis forces. The sensors measure the (sinusoidal) displacements (in mm) of points of the tube as a function of time (in seconds) by means of a voltage.

Figure 13A:
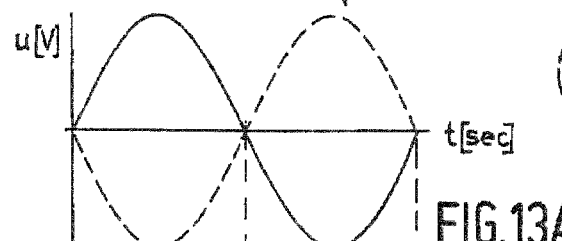
FIG. 13A shows a phase difference between the signals of the sensors of FIG. 12 measured when there is no flow through the sensing tube.

FIG. 13A shows the output signals of the sensors 11a, 11b for the case in which no medium flows through the tube (zero flow), the curve indicated with arrow 1 representing the measuring signal of sensor 11a and the curve indicated with arrow 2 representing the measuring signal of sensor 11b. The phase difference is 180°.

Figure 13B:
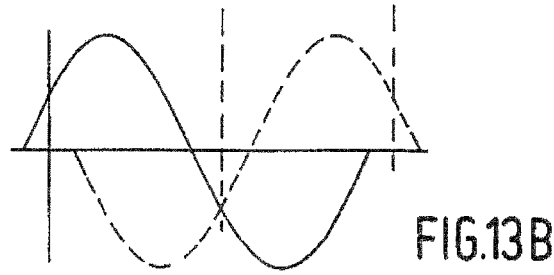
FIG. 13B shows the situation in which there is a mass flow through the sensing tube.

FIG. 13B shows the situation in which in which a medium does flow through the tube. The phase difference now is smaller than 180°. If the rotation pole does not lie exactly in the center between the first and the second sensor, however, the result of the measurement will not be accurate.

A more accurate measurement is possible if a third sensor is placed adjacent one of the sensors of FIG. 12 and in line with these sensors. A phase difference between the sensors 11a and 11b owing to a possible shift of the rotation pole can be corrected by means of the measuring signal from the third sensor. Without flow this difference is 180° in the case of a symmetrical sensor arrangement, while in the extreme case in which a sensor lies on the pole it is no more than 90°. The three sensors supply three measured values while there are also three unknown factors, i.e. the two—different—phase angles of the first and the second sensor and the position of the rotation pole between the first and the second sensor. The value measured by the third sensor can be used in a processing device for determining the location of the rotation pole, whereupon the—equal—phase angles of the first and the second sensor can be determined for a fictitious pole position that does lie centrally between the first and the second sensor. The measuring and detection system described here does not require any amplifier, so that no undesirable phase shifts are caused, and is suitable for use with all Coriolis flowmeters.

Figure 14:
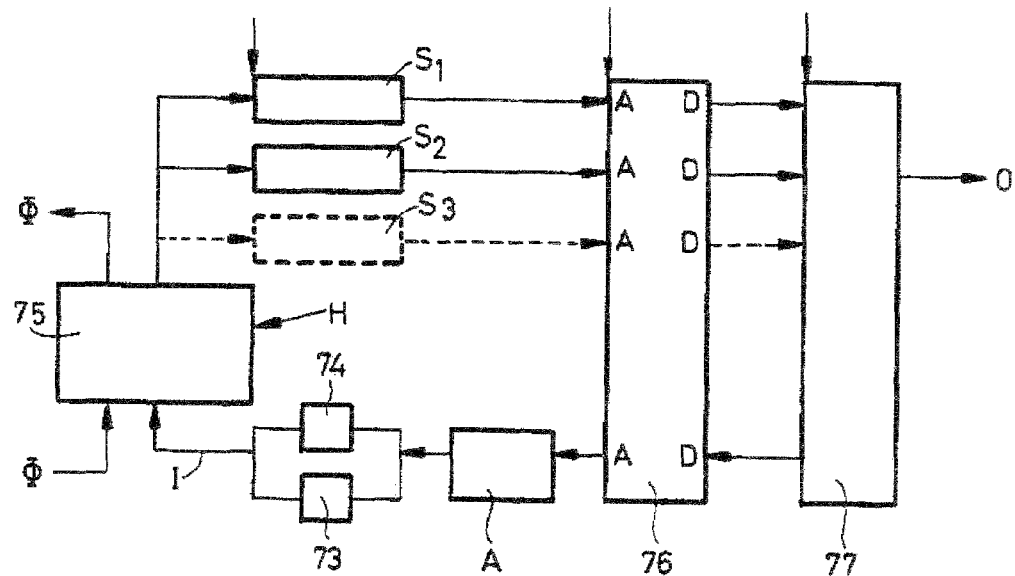
FIG. 14 is a block diagram representing the excitation, measurement, and processing of the measured values when a flowmeter according to the invention is used.

FIG. 14 is a block diagram showing the operation of an embodiment of a Coriolis flowmeter according to the invention. An electric current I is induced in a Coriolis tube system 75 by means of two coils 73, 74 wound on two cores. The coils 73, 74 are energized by an amplifier A that is controlled from a digital signal processor 77 via an AD/DA converter 76. A magnetic field H transverse to the direction of the current I is applied across the tube system 75. The tube system 75, or a portion thereof, starts to vibrate under the influence of H and I. Superimposed on this vibration is a vibration caused by Coriolis forces when a medium F flows through the tube system. The movements of the tube system are measured by sensors S1 and S2, or sensors S1, S2, and S3. The analog signals from the sensors S1, S2, (S3) are supplied to an AD/DA converter 76. The output signals of the AD/DA converter are supplied to a (digital) signal processor 77. The digital signal processor 77 generates an output signal 0 that represents the mass flow.

FIG. 15 is a perspective view of a mechanically closed, loop-shaped tube 78 (rectangular in this case), but in an alternative embodiment the closed, loop-shaped tube may have, for example, a delta shape. A first end 79 of the loop 78 is connected to a flexible inlet tube 80 which supplies a medium flow F, and a second end 81 of the loop 78 is connected to a flexible outlet tube 80 which discharges the medium flow F. The looped tube 78 and the tubes 80, 81 are preferably bent from one piece of tubing. The loop 78 comprises a first transverse tube portion 84 which is connected to first ends of two lateral tube portions 85, 86. The latter are connected by their second ends to two second transverse tube portions 87, 88 that each have approximately half the length of the first transverse tube 84. The inlet and outlet tubes 80, 82 in this construction extend symmetrically through the center of the loop 78, lie close together or against one another, and are mechanically interconnected in locations referenced b, for example by means of soldering or welding. They are fastened, next to or against one another, in a recess 83a of a fastening means 83 which in its turn is fastened to a frame (not shown). The loop 78 is resiliently suspended from the frame of the flowmeter (not shown) by means of the inlet and outlet tubes 80, 82 (and the fastening means 83). The looped tube 78 may cooperate with a permanently magnetic magnet yoke for the purpose of excitation, such as the magnet yoke described with reference to FIG. 1 and comprising yoke portions 6 and 7 located opposite a lower yoke portion 8 with two air gaps 9 and 10 enclosed between them, a magnet 12 being placed in the path of the magnet yoke. For example, the tube portions 87, 88 may extend through the air gaps of the magnet yoke (magnet yoke around the upper transverse tubes). When an alternating current flows through the looped tube 78, the loop will perform an oscillatory rotation about an axis (the excitation axis) extending in the plane of the looped tube under the influence of the Lorentz forces generated in the air gaps of the yoke by the current and the oppositely directed magnetic fields (so-termed torque excitation). When a medium flows through the tube 78, Coriolis forces are generated which cause a Coriolis effect. The Coriolis forces cause the tube 78 to oscillate about a Coriolis response axis that is perpendicular to the excitation axis. Coriolis effect sensors may be arranged in the central opening of the magnet yoke (and accordingly cooperate with the upper transverse tubes during operation).

An alternative is to arrange the sensors adjacent the lower transverse tube portion 84 such that they can cooperate with the lower transverse tube during operation. Depending on the location of the torque excitation yoke relative to the rectangular looped tube of FIG. 15, the tube can be made to enter either a swing mode or a twist mode. That is: either it is twisted about the central axis of symmetry between the inlet and outlet tubes, or it is made to swing about an asymmetrical excitation axis transverse to the central axis of symmetry, in which case the torque excitation yoke cooperates with a lateral tube portion.

Figure 16:
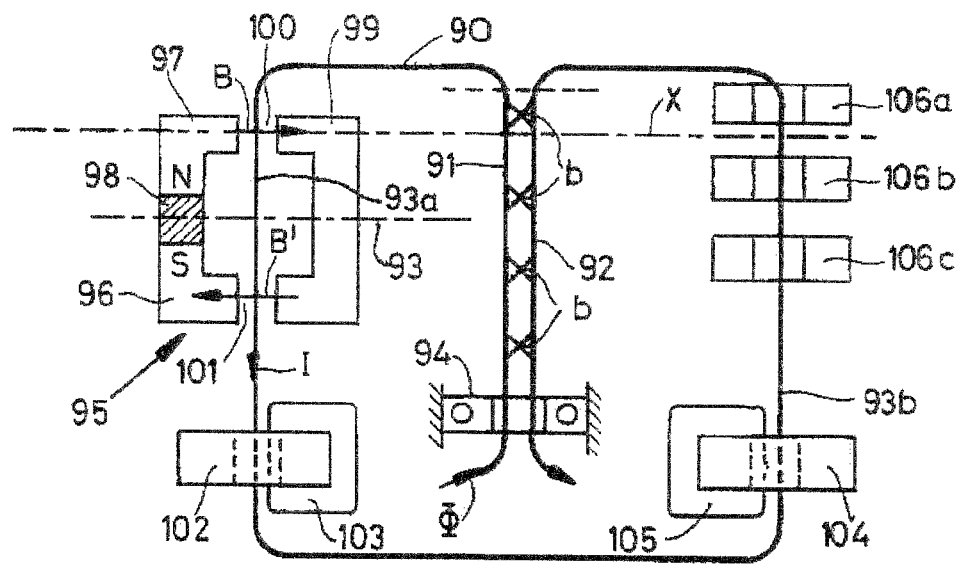
FIG. 16 diagrammatically shows a Coriolis flow sensor arrangement having a looped tube equipped with a torque excitation yoke and with Coriolis effect sensing means.

FIG. 16 diagrammatically shows a flowmeter of the Coriolis type with a looped sensing tube 90 of the kind shown in FIG. 15. The looped tube 90 has two ends which are connected to an inlet tube 91 for a fluid medium F and an outlet tube 92, respectively. The inlet and outlet tubes 91, 92 are interconnected, as were the inlet and outlet tubes 80 and 82 of FIG. 15, for example through soldering in locations b or spot welding, and they are fixed in fastening means 94 in a location remote from their connections to the looped tube 90. The fastening means 94 shown here comprise a block having a central recess in which the inlet and outlet tubes are accommodated. The block has two openings for fastening to a frame by means of bolts. The tube 90 is excited in the swing mode in this case. For this purpose, a magnet yoke 95 with two air gaps 100 and 101 is placed at one of the lateral sides of the looped tube 90 such that the leg 93a of the loop runs through the air gaps 100, 101. The yoke has an upper part with two yoke portions 96, 97 between which a permanent magnet 98 is arranged with a South pole S directed towards the yoke portion 96 and a North pole N directed towards the yoke portion 97. Oppositely directed magnetic fields B and B', which are of equal strength in the ideal case, are generated in the air gaps 100, 101 between the upper portion 96, 97, 98 and the lower portion 99 by this construction. When an alternating electric current/flows through the tube 90, these fields B' and B exert a torque excitation on the tube portion 93a. The tube 90 will perform a swinging movement about an axis of rotation (X) owing to the torque excitation when traversed by an alternating current I. The excitation axis of rotation X in this embodiment, therefore, is perpendicular to the inlet and outlet tubes. The yoke 95 is a torque generator.

An alternating current I is induced in the tube 90 in the same manner as in the embodiment of FIG. 3. For this purpose, the lateral portions 93a, 93b of the tube 90 are passed through bores in the respective transformer cores 102 and 104 on which respective coils 103 and 105 have been wound at the sides that face one another. The invention, however, is not limited to this. For example, the transformer or coil cores may be provided in alternative locations of the tube 90.

When a fluid F flows through the tube 90 oscillating about the excitation axis of rotation X, a Coriolis force arises which causes a Coriolis effect. The Coriolis effect is measured with a Coriolis sensor. The Coriolis sensor used in the present embodiment is a system of contactless optical sensors 106a, 106b, 106c identical to the system of contactless optical sensors 11a, 11b, 11c of the construction in FIG. 1, but the invention is not limited thereto.

Two of the optical sensors, 106a and 106b, are arranged symmetrically with respect to the excitation axis of rotation (the axis of rotation X in this case) in the construction of FIG. 16. The optical sensors 106a, 106b (and 106c) here cooperate with the lateral portion 93b of the loop 90, which portion is located opposite the portion 93a that cooperates with the magnet yoke providing the torque excitation.

FIGS. 15 and 16 show a looped rectangular tube with a more or less square circumference. This was found to be a favorable shape as regards the sensitivity, given the correct surface area. If this should be favorable for the placement of the excitation means, the current induction means, and/or the Coriolis effect sensing means, however, it is possible to make the loop, for example, narrower and proportionally higher.

Figure 17:
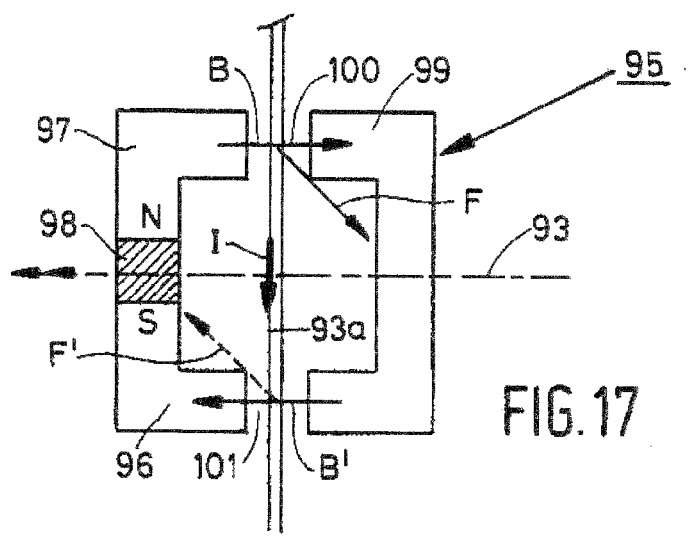
FIG. 17 shows in greater detail the torque excitation yoke used in the arrangement of FIG. 16.

The operation of the integrated magnet yoke 95 will now be explained with reference to FIG. 17. The placement of the permanent magnet 98 between the upper yoke portions 96 and 97 generates oppositely directed magnetic fields B and B' of equal strength in the air gaps 100,101. If B in the air gap 100 is directed towards the yoke portion 99 and the current direction is as shown in FIG. 17, then a (Lorentz) force F directed to the front will act on the tube 90. At the same time, the magnetic field B' in the air gap 101 is directed towards the yoke portion 96. This results, in combination with the current I, in a (Lorentz) force F' on the tube 90 directed towards the rear. Accordingly there is a torque excitation. The forces acting on the tube are reversed when the current I through the tube changes direction. The supply of an alternating current to the tube 90 thus leads to a swinging movement of the looped tube 90 about the axis of rotation X.

In brief, the invention relates to a mass flowmeter of the Coriolis type with a tube through which a medium flows in operation, and with excitation means for causing the entire tube or a portion thereof to perform a rotational oscillation about an excitation axis of rotation in operation, wherein the excitation means are electromagnetic, do not make contact with the tube during operation, and have no components that are fastened to the tube.

The Coriolis effect sensors are preferably optical sensors, also do not make contact with the tube, and do not comprise components that are fastened to the tube.

The invention claimed is:

1. A mass flowmeter of the Coriolis type, comprising:
   a sensing tube through which a medium flows during operation; and
   excitation means for causing the sensing tube to oscillate about an excitation axis of rotation,
   wherein the excitation means in operation do not make contact with the tube and have no components that are fastened to the tube, and
   wherein the excitation means generate two magnetic fields, each acting on a portion of the tube, in order to achieve a Lorentz force torque excitation of the tube or tube portion about the excitation axis.

2. A mass flowmeter of the Coriolis type, comprising:
   a sensing tube through which a medium flows during operation; and
   excitation means for causing the entire tube or part thereof to oscillate about an excitation axis of rotation,
   wherein the excitation means in operation do not make contact with the tube and have no components that are fastened to the tube,
   wherein the sensing tube is U-shaped, and
   wherein the excitation means comprise a magnet yoke, the magnet yoke having two air gaps through which opposite portions of the U-shaped tube extend, in order to achieve a Lorentz force torque excitation of the tube about the excitation axis.

3. The mass flow meter as claimed in claim 2, wherein the magnet yoke is energized by a permanent magnet accommodated in the magnet yoke.

4. The mass flow meter as claimed in claim 3,
   wherein the magnet yoke has an upper leg remote from the air gaps, and
   wherein the permanent magnet is accommodated in the center of the upper leg.

5. The mass flow meter as claimed in claim 2,
   wherein the U-shaped tube has two lateral arms, and
   wherein the excitation is on the lateral arms of the U-shaped tube.

6. The mass flow meter as claimed in claim 2,
   wherein the U-shaped tube has two lateral arms, and
   wherein the excitation is on the bends of the lateral arms of the U-shaped tube.

7. A mass flowmeter of the Coriolis type; comprising:
   a sensing tube through which a medium flows during operation; and
   excitation means for causing the entire tube or part thereof to oscillate about an excitation axis of rotation,
   wherein the excitation means in operation do not make contact with the tube and have no components that are fastened to the tube, and
   wherein the excitation means comprises a magnet yoke which is adapted to function as a torque generator for the sensing tube.

* * * * *